(12) United States Patent
Patil

(10) Patent No.: US 10,717,358 B2
(45) Date of Patent: Jul. 21, 2020

(54) CONFIGURABLE VEHICLE CONSOLE

(71) Applicant: Ford Global Technologies, LLC, Dearborn, MI (US)

(72) Inventor: Uday Kiran Patil, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 16/111,734

(22) Filed: Aug. 24, 2018

(65) Prior Publication Data

US 2020/0062119 A1 Feb. 27, 2020

(51) Int. Cl.
*B60K 37/00* (2006.01)

(52) U.S. Cl.
CPC ......... *B60K 37/00* (2013.01); *B60K 2370/77* (2019.05)

(58) Field of Classification Search
CPC ............................ B60K 37/00; B60K 2370/77
See application file for complete search history.

(56) References Cited

U.S. PATENT DOCUMENTS

| | | | | |
|---|---|---|---|---|
| 6,517,138 B1 * | 2/2003 | Arthur | ............... | B60H 1/00985 180/90 |
| 7,543,871 B2 * | 6/2009 | Quigley | .................. | B60R 11/02 296/24.34 |
| 7,594,675 B2 * | 9/2009 | Bostrom | ............... | B60R 21/207 280/728.2 |
| 9,340,126 B2 | 5/2016 | Cuddihy et al. | | |
| 9,855,860 B2 | 1/2018 | Ahn et al. | | |
| 9,983,619 B2 * | 5/2018 | Yamawaki | .............. | G06F 3/041 |
| 2007/0164609 A1 | 7/2007 | Shalam et al. | | |
| 2008/0129024 A1 * | 6/2008 | Suzuki | ............. | B60R 21/23138 280/734 |
| 2009/0146004 A1 * | 6/2009 | Plant | ..................... | B64D 11/06 244/118.5 |
| 2010/0187847 A1 * | 7/2010 | Jones | ...................... | B60R 13/02 296/1.08 |
| 2013/0076082 A1 * | 3/2013 | Herault | .................... | B60N 2/00 297/173 |
| 2014/0283296 A1 | 9/2014 | Jerome et al. | | |
| 2016/0191572 A1 * | 6/2016 | Joy | ....................... | H04L 12/413 370/402 |
| 2018/0222394 A1 * | 8/2018 | Huebner | ................. | B60N 3/101 |
| 2018/0272977 A1 * | 9/2018 | Szawarski | ......... | B60R 21/01512 |
| 2018/0312082 A1 * | 11/2018 | Lalague | ................ | B60R 21/026 |
| 2018/0312127 A1 * | 11/2018 | Lalague | ................ | B62D 33/042 |
| 2018/0361981 A1 * | 12/2018 | Faruque | ................ | B60R 21/214 |
| 2019/0077286 A1 * | 3/2019 | Filipkowski | ........... | B60H 1/242 |
| 2019/0315303 A1 * | 10/2019 | Kia | ........................ | B60R 21/215 |

FOREIGN PATENT DOCUMENTS

| | | | | |
|---|---|---|---|---|
| EP | 1405758 A2 * | 4/2004 | ............. | B60N 3/001 |
| EP | 1685990 A1 * | 8/2006 | ......... | B60H 1/00064 |
| KR | 20060132184 A * | 12/2006 | | |
| KR | 20180051114 A | 5/2018 | | |

* cited by examiner

*Primary Examiner* — Lori L Lyjak
(74) *Attorney, Agent, or Firm* — Frank A MacKenzie; Bejin Bieneman PLC

(57) ABSTRACT

A vehicle comprises a console that includes a separator sheet extendable beyond boundaries of the console, and at least one of a human-machine interface; a passive restraint, a storage container, and a vent.

20 Claims, 8 Drawing Sheets

CONFIGURABLE VEHICLE CONSOLE

BACKGROUND

Vehicles can be used for different purposes, e.g., transporting passengers, transporting cargo, transporting a combination of cargo and passengers, etc. A same part of a vehicle cabin may be used for such different purposes, e.g., transporting passengers only on one trip, passengers and cargo (e.g., luggage) on another trip, and transporting cargo only on yet another trip.

DETAILED DESCRIPTION

Figure 1:
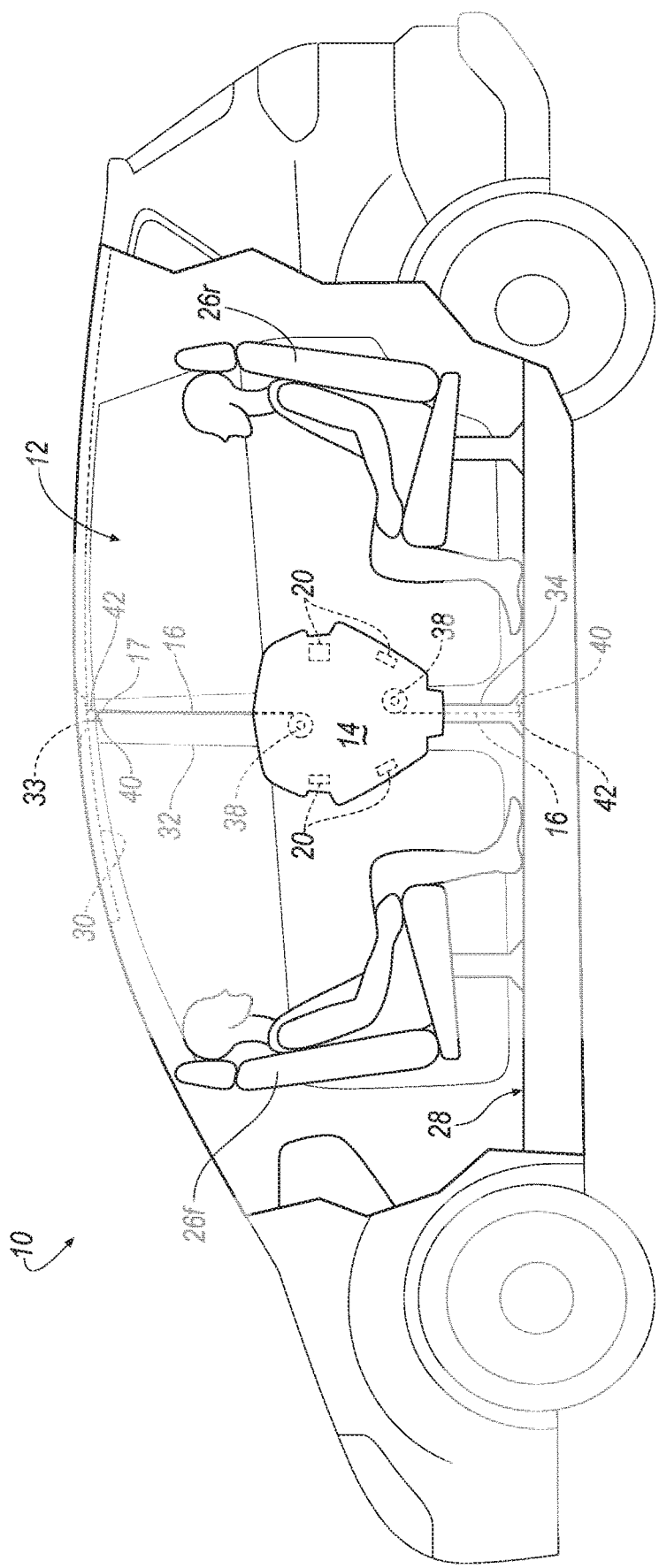
FIG. 1 is a side view of a vehicle including an exemplary configurable console.

A vehicle comprises a console that includes a separator sheet extendable beyond boundaries of the console, and at least one of a human-machine interface; a passive restraint, a storage container, and a vent.

The vehicle can further comprise a forward seat and a rear seat that face each other in a deployed position, wherein the console is forward of the rear seat and aft of the forward seat in the vehicle.

The vehicle can further comprise a seat, wherein the console is arranged on a track whereby the console is longitudinally movable in the vehicle toward and away from the seat.

The vehicle can further comprise a seat, wherein the sheet is extendable from the console to cover the seat when the seat is in a stowed position.

The sheet can be extendable at least one of vertically and horizontally, movable among a plurality of angles to a horizontal or vertical plane, extendable such that an end of the sheet is movable between a plurality of distances from a point on a surface of the console, and/or securable to one or more of a vehicle pillar, a vehicle seat, a vehicle cabin floor, and a vehicle cabin ceiling.

The console can be mounted to a vertical track, whereby the console is vertically movable, and/or can includes a second separator sheet extendable beyond boundaries of the console. The separator sheet and the second separator sheet can be extendable from opposite surfaces of the console. The sheet can be tamboured, and/or can include at least one of fabric and flexible plastic. The fabric and/or the flexible plastic can be substantially one piece.

The sheet can be configurable to provide a footrest.

A same side of the console can face at least a first seat and a second seat in the vehicle.

The console can extend along a lateral axis of the vehicle from a point on a longitudinal axis with a point on the first seat to a point on a longitudinal axis with a point on the second seat.

The vehicle can further comprise a second console that includes a second separator sheet extendable beyond boundaries of the second console, and at least one of a second human-machine interface; a second passive restraint, a second storage container, and a second vent.

The vehicle can further comprise a first track and a second track that are each parallel to one of a lateral and a longitudinal axis of the vehicle, wherein the console is moveable on the first track and the second console is movable on the second track. The console can be movable on the first track independently from the second console on the second track.

As illustrated in the various figures, a vehicle 10 comprises a cabin 12 in which a configurable console 14 is situated. The console 14 includes a separator sheet 16 extendable beyond boundaries defined by surfaces of the console 14, and at least one of a human-machine interface (HMI) 18, a passive restraint 20, a storage container 22, and a vent 24. The figures illustrate various configurations and numbers of seat 26, consoles 14, sheets 16, etc. It is to be understood that the illustrations are provided as non-limiting examples. For example, fewer or more rows of vehicle 10 seats 26 could be provided, including rows, e.g., a front row for an operator or driver of the vehicle 26, that do not have access to a console 14.

The console 14, along with one or more seats 26, including a forward seat 26f and a rear seat 26r, can be supported on a floor 28 of the cabin 12 by one or more supports 34 that can be secured to a track 36. Thus, the console 14 can be movable toward and away from a seat 26, and can be locked and/or secured in place, e.g., tongues, balls, etc., extending from ends of supports 34 could fit in grooves or the like in tracks 36, and the console 14 could be moved and/or secured or locked in place using conventional mechanisms. Alternative or additionally, although not shown in the figures, the console 14 could be suspended from a cabin ceiling 30 or roof in the vehicle 10, e.g., supports 34 could to be secured to one or more tracks 36 in turn secured to the ceiling 30. In the illustrated example, respective sheets 16 can be extended from opposite surfaces or sides, e.g., a top surface and a bottom surface of the console 14, but in other examples the console 14 could include only one sheet 16, more than two sheets 16, and/or a sheet 16 extending from some other surface.

The console 14 is a cabinet or housing to house one or more vehicle 10 components, including, in the illustrated example, the HMI 18, the passive restraint 20, the storage container 22, and the vent 24. One each of the HMI 18, passive restraint 20, storage container 22, and vent 24 are illustrated, but any of these could be omitted, or more than one of each could be included in a console 14. The HMI 18 includes hardware for allowing one or more computing devices in the vehicle 10 to provide output to, and receive input from, a user. Accordingly, the HMI 18 could include a display touchscreen, a microphone, and/or a speaker, etc. The passive restraint 20 could be an airbag or the like, arranged to deploy from the console 14 according to conventional technology, e.g., as an airbag may be provided to deploy from a vehicle instrument panel, steering wheel, etc. The storage container 22 is formed of a cavity or space in the console 14, an may be provided with a closable lid or door. The vent 24 is typically part of a vehicle 10 climate control system, e.g., providing ventilation heated air, cooled air, etc., into the vehicle cabin 12. Wiring and ducting can be supplied to the console 14, e.g., for the HMI 18, vent 24, etc., via conventional conduits, e.g., in a support 34, which could be hollowed to allow for wiring, ducting, etc.

Figure 5:
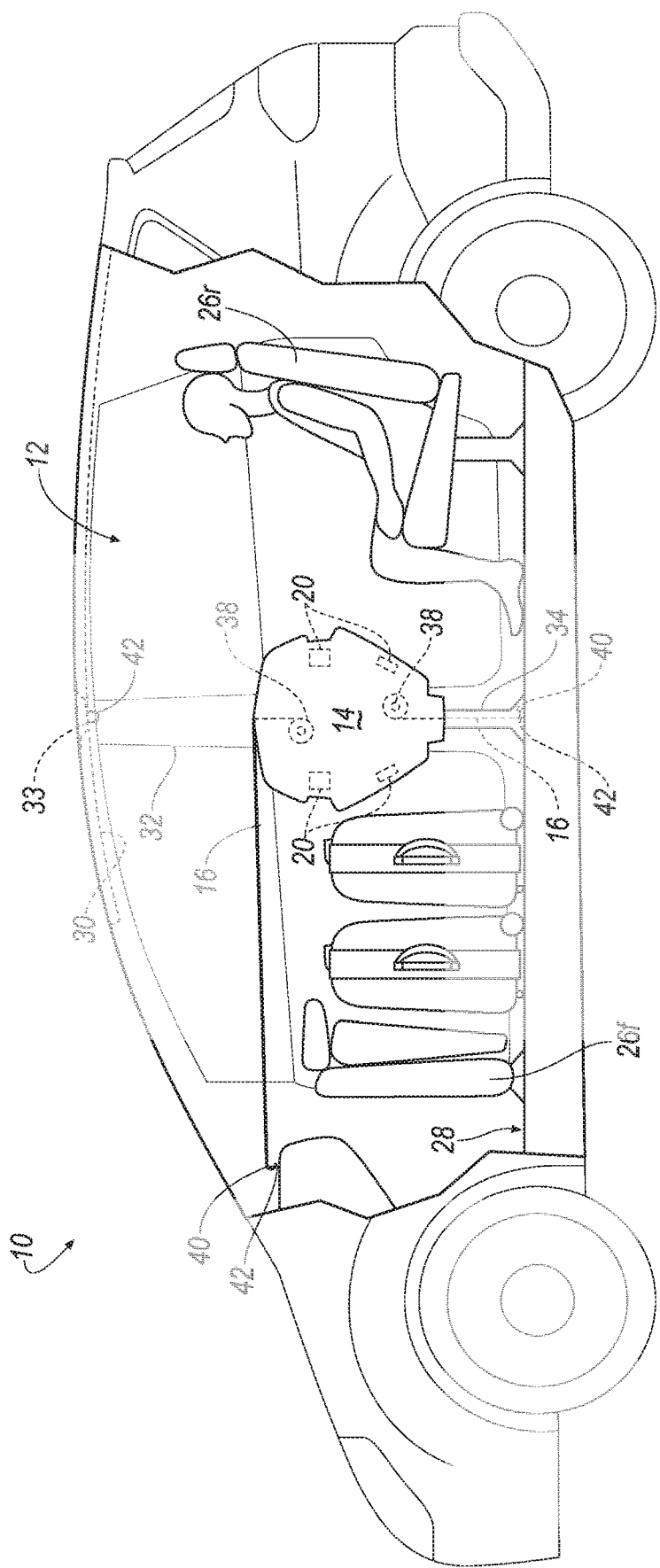
FIG. 5 is a side view of a vehicle including an exemplary configurable console and seats in respective deployed and stowed positions.
Figure 6:
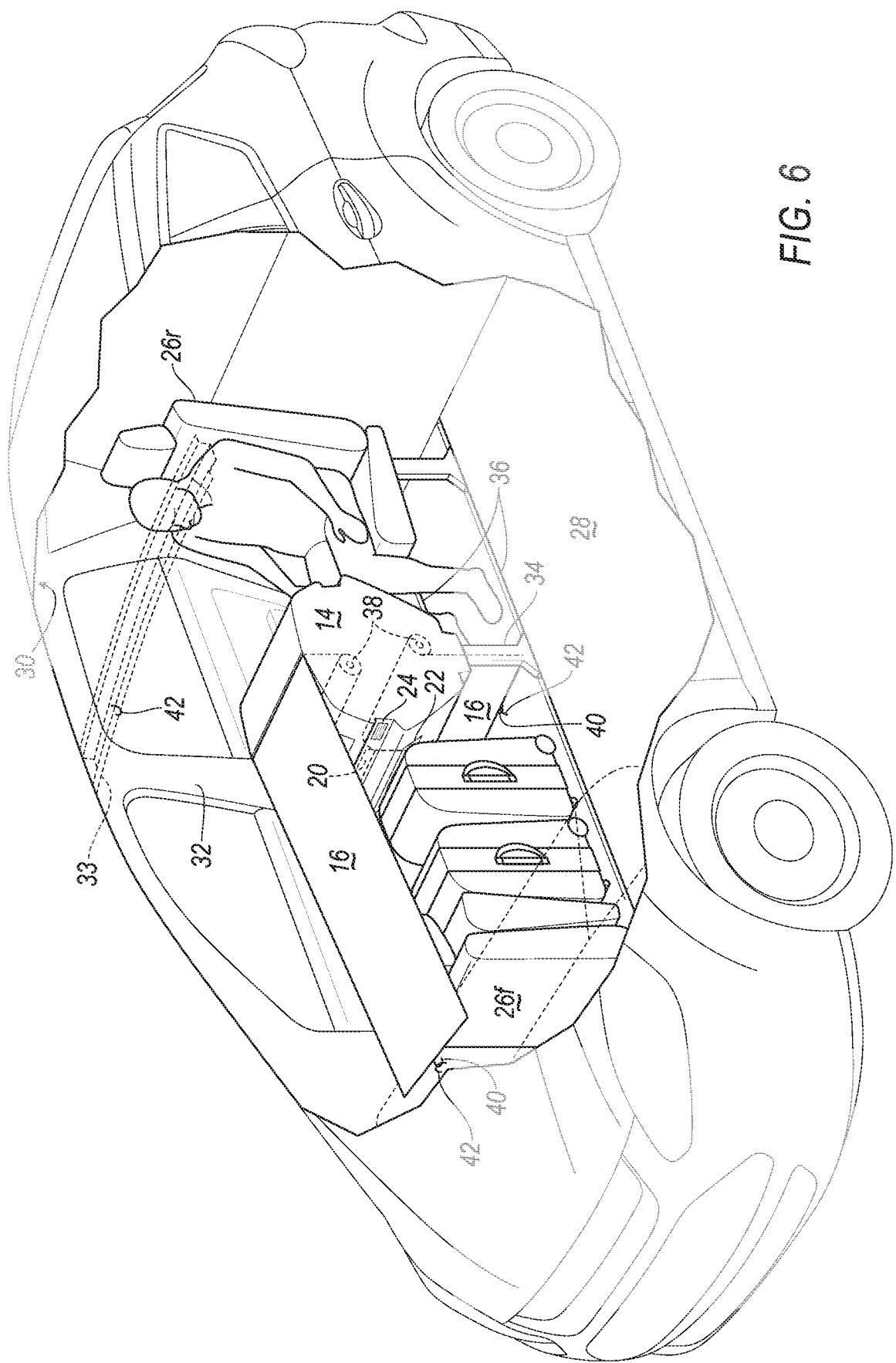
FIG. 6 is a perspective view of a vehicle including an exemplary configurable console and seats in respective deployed and stowed positions.

The seats 26*f* and 26*r* may be movable from a stowed or folded position or state to an unfolded or deployed state, i.e., so that the seat 26 may accommodate a passenger. FIGS. 5 and 6 show a forward seat 26*f* in a folded or stowed position and a rear seat 26*r* in the deployed position. The seats 26*f* and 26*r* can face each other when each is in the deployed position (see FIGS. 1-4). The console 14 can then be arranged between the seats 26*f*, 26*r*, i.e., forward of the rear seat 26*r* and aft of the forward seat 26*f* in the vehicle cabin 12.

Mounting the console 14 to the track(s) 36 allows the console 14 to move longitudinally with respect to the vehicle 10. The tracks 36 can utilize a variety of mechanisms to allow engaging and securing supports 34, and allowing movement of the console 14. For example, alternatively or additionally to examples mentioned above, a support 34 could terminate in a gear riding on a rack, and could be movable and lockable (e.g., using a brake or stop or other conventional locking mechanism) manually and/or via a motor provided with a linear drive. Moreover, the support(s) 34 could include a track for engaging the console 14 to allow the console 14 to be moved vertically, i.e., up and down, in the cabin 12.

Figure 3:
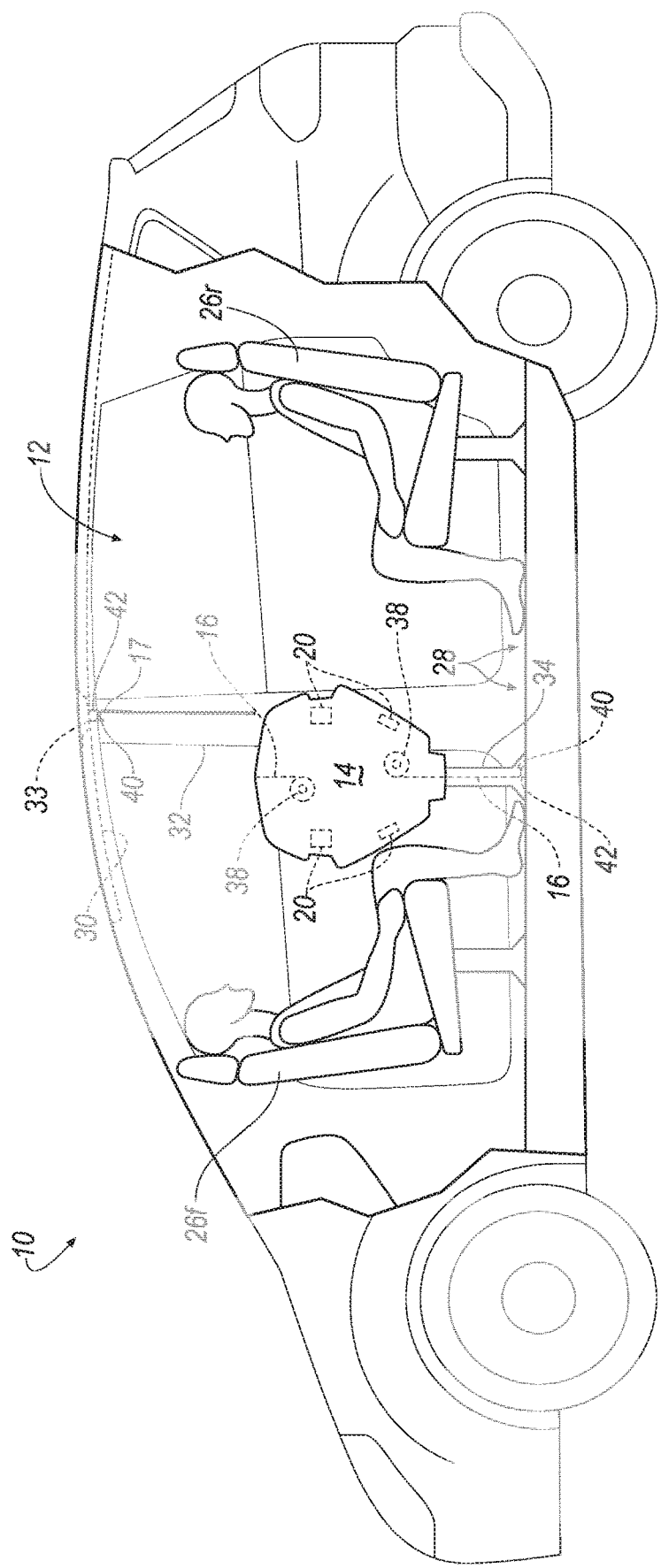
FIG. 3 is a second side view of the vehicle including another exemplary arrangement of the configurable console.

FIG. 3 shows seats 26*f*, 26*r* with each in a deployed position, and the console 14 moved from a position where it was substantially equidistant from the seats 26*r*, 26*f* to a position where the console 14 is closer to the seat 26*f*. Thus, the cabin 12 can be reconfigured, e.g., by so moving the console 14, to allow for accommodating passengers of different sizes, passengers paying for different classes of ticket, etc., e.g., a first class passenger or a larger passenger could be given more space between a seat 26 and the console 14 than a passenger paying an economy fare or than a smaller passenger.

Figure 4:
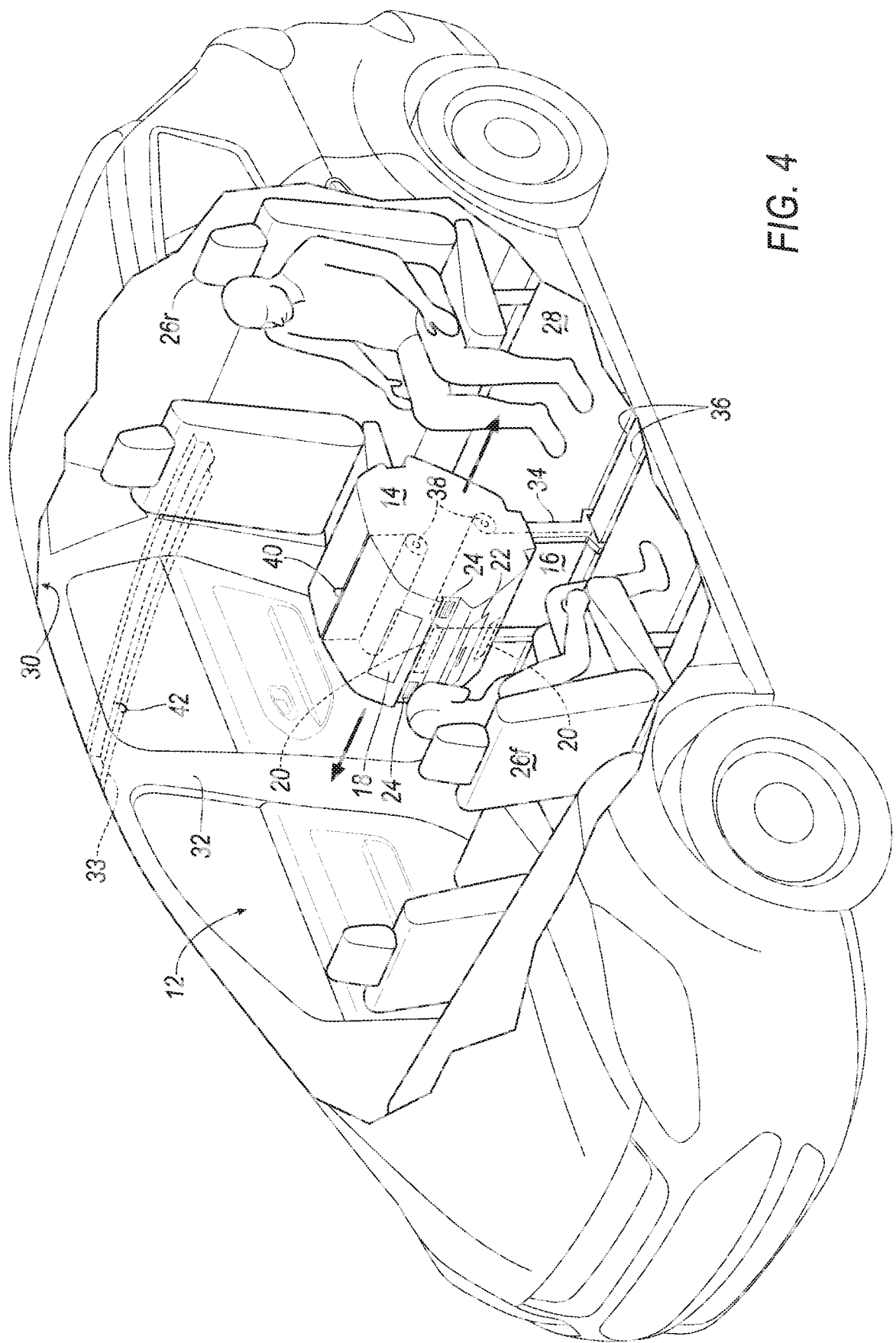
FIG. 4 is a perspective view of a portion of the cabin of the vehicle of FIG. 1, including another exemplary arrangement including the configurable console.

Further, as seen in FIG. 4, one or more tracks 36 could substantially define a lateral axis or axes of the vehicle 10 (or could be at some other angle to a lateral or longitudinal axis of the vehicle 10. Accordingly, a console 14 could be moveable laterally within the vehicle cabin 12, e.g., to move the console 14 so as to be accessible to a user of a specified seat 26, to make the console accessible by a plurality of seats 26 that are laterally situated next to each other (e.g., seats 26 in a same row), to provide space for user ingress or egress, etc.

As seen in FIGS. 1, 3, 5, and 6, the sheet 16 is extendable from the console 14 at least one of vertically and horizontally. For example the sheet may be deployed from a roller 38, which can be spring-loaded and can include a conventional ratchet and pawl (e.g., as used in some window shades) to provide for extension and retraction of the sheet 16, e.g., by a user holding a free end 17 of the sheet 16. Further alternatively or additionally, although not shown, a motor could be used to move a roller 38 and provide extension or retraction of the sheet, e.g., actuated according to user input provided via the HMI 18.

The sheet 16 is generally flexible and can be made from a variety of materials and in a variety of configurations. For example, the sheet 16 can be made from a fabric or flexible plastic allowing the sheet 16 to be rolled onto the roller 38. In another example, the sheet 16 can be tamboured, e.g., in the manner of a garage door or roll-top desk cover. Thus, individual bars or elongated elements of the sheet 16 can be stiff, but can be secured together in a variety of ways that are known, e.g., with hinges, fabric backing, cooperative slots and beads, etc. In any event, providing the sheet 16 on the roller 38 means that the sheet is extendable such that an end of the sheet is movable between a plurality of distances from a point on a surface of the console. For example, the vertical and horizontal extensions of the sheet may require that the sheet extend for different distances. Advantageously, the sheet 16 can provide visual privacy and/or noise insulation for vehicle 10 occupants. Further, the sheet 16 is preferably made of a material having sufficient strength, e.g., a plastic or fabric, to retain luggage and other objects (see FIGS. 5-7.) Yet further, the sheet 16 could be used as a display surface, e.g., to receive a projection of information, entertainment, etc., and or could include a flexible display such as a currently being developed.

Further, the sheet 16 can include a securing mechanism 40, e.g., a hook, clip, snap, VELCRO® strip, etc. that can be mated to an anchor 42, e.g., a complimentary hook or receiver for a clip or snap, complimentary VELCRO strip, etc. An anchor 42 can be mounted to a portion of a vehicle 10 body, such as a pillar 32, a roof rail 33, etc., and/or a component in a vehicle, such as a seat 26 (see FIG. 2). Thus, by pulling the free end 17 of the sheet 16 a user can extend the sheet 16 from the console 14, and can then attach one or more securing mechanisms 40 on the end 17 to one or more respective anchors 42. The securing mechanism is typically attached to the sheet 16 at or near the free end 17, and may be configured as a hook or handle to facilitate a user pulling the sheet 16 from the console 14 and/or guiding the sheet 16 as it retracts form an extended position to be rolled back onto the roller 38.

Figure 2:
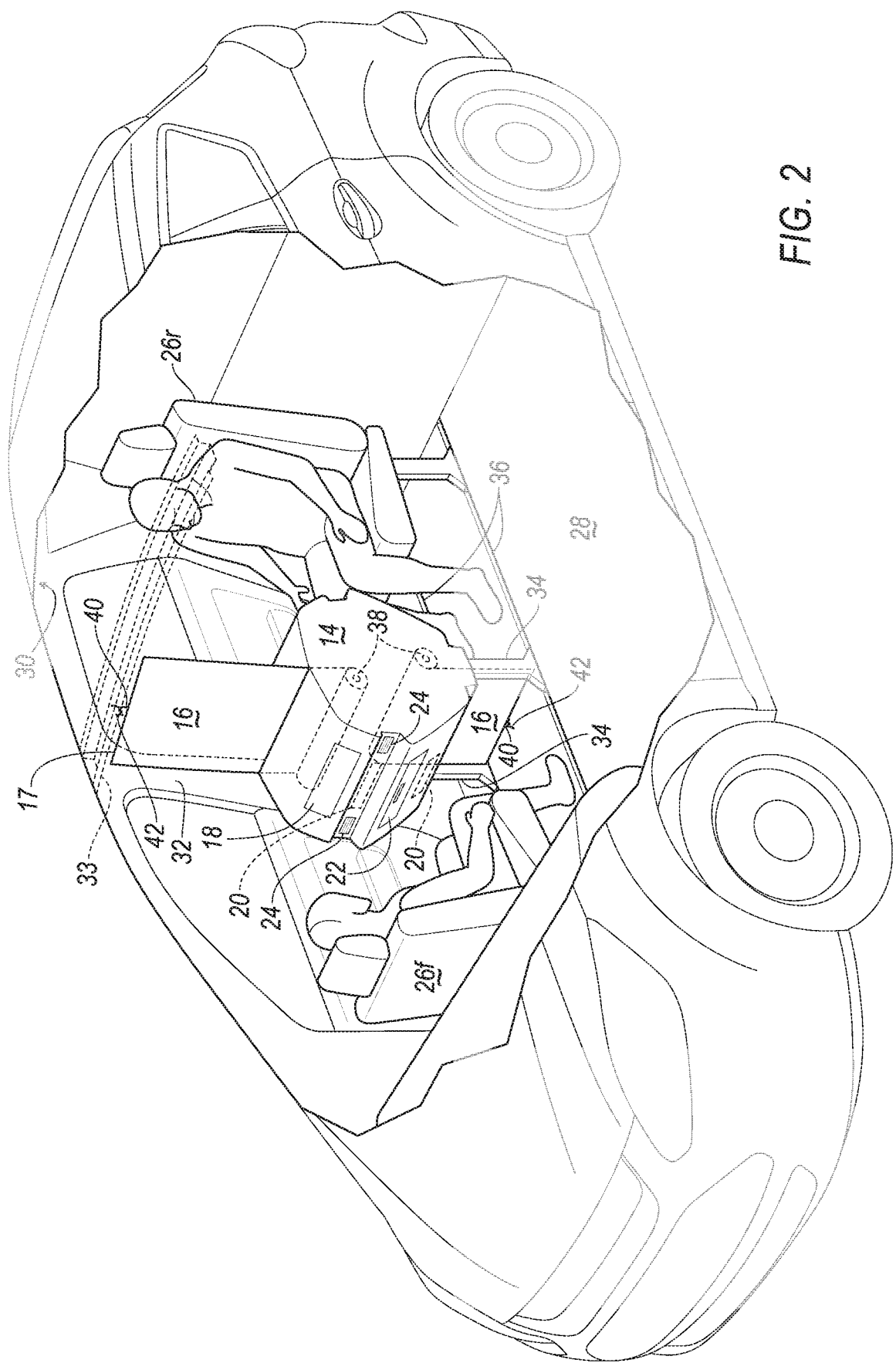
FIG. 2 is a perspective view of a portion of the cabin of the vehicle of FIG. 1, including an exemplary arrangement including the configurable console.

For example, as seen in FIGS. 1, 2, and 5, a sheet 16 can be extended from a top surface of the console 14 and secured in a vertical position, e.g., a securing mechanism 40 can be secured to an anchor 42 on a cabin ceiling 30 and or a vehicle pillar 32. Moreover, a sheet 16 can be extended from a top surface of the console 14 and secured in a horizontal position, e.g., a securing mechanism 40 can be secured to an anchor 42 on a seat 26, a pillar 32, or some other structure in the cabin 12, whereby the sheet 16 can cover and/or secure one or more items such as a seat 26 in a stowed position, cargo, luggage, etc. Similarly, a sheet 16 could be extended horizontally and secured to form a surface, e.g., a table-like structure, on which a user could place items, such as portable devices, snacks, etc.

Figure 7:
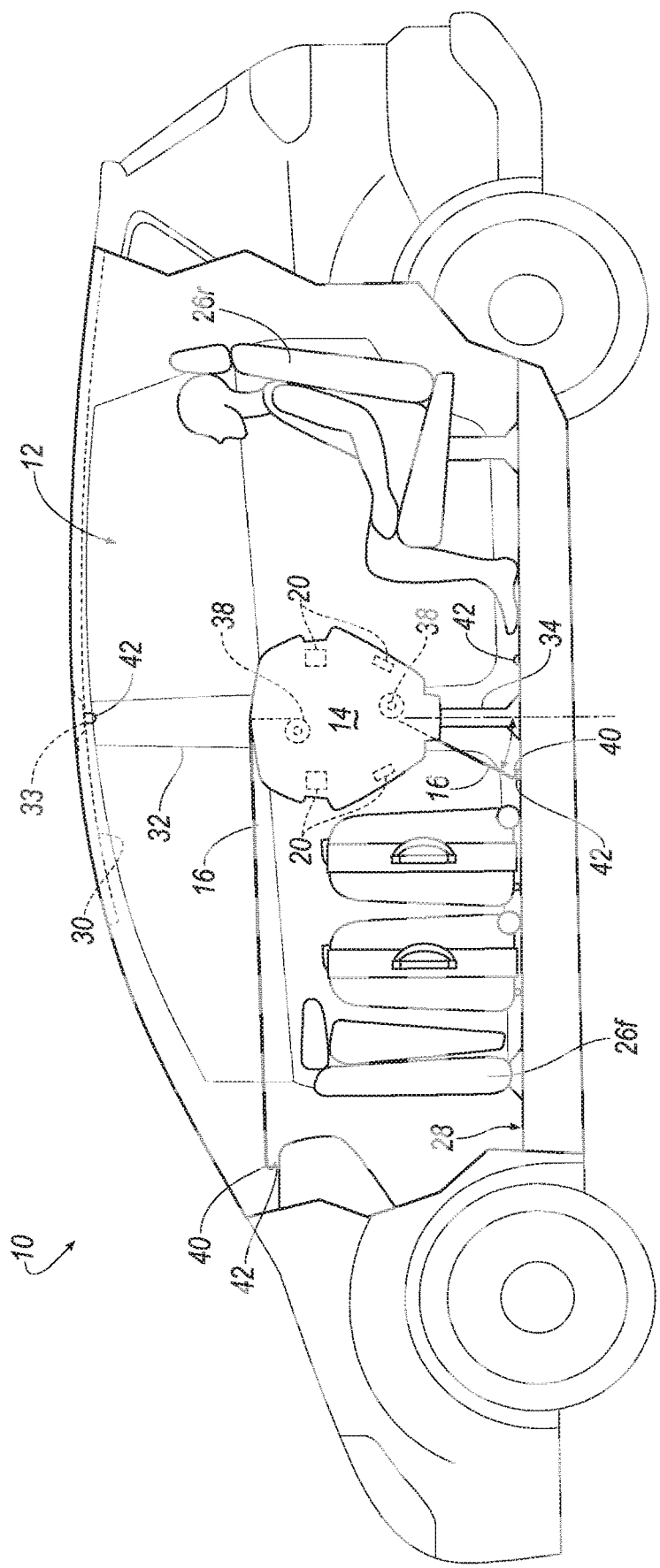
FIG. 7 is a side view of an exemplary console including a sheet extending from a bottom surface of the console, and arranged at angles to a vertical plane.

As further seen in FIGS. 1-3 and 5-6, a sheet 16 can extend vertically from a bottom surface of the console 14, e.g., a securing mechanism 40 can be secured to an anchor 42 on a vehicle floor. Further, a sheet 16 (or a portion of a sheet 16 sufficient to act as a footrest) can be movable among a plurality of angles to a horizontal or vertical plane. For example, FIG. 7 shows a sheet 16 extending from a bottom surface of the console 14, and arranged at angles to a vertical plane. Anchors 42 could be arranged on a cabin floor 28 to allow the sheet 16 to be arranged at a plurality of different angles. Thus, a sheet 16 can be moved relative to the console 14 to provide a user with more or less legroom, for example. Further, the sheet 16 by itself could serve as a footrest and/or be provided with one or more deployable flaps to serve as footrests.

Figure 8:
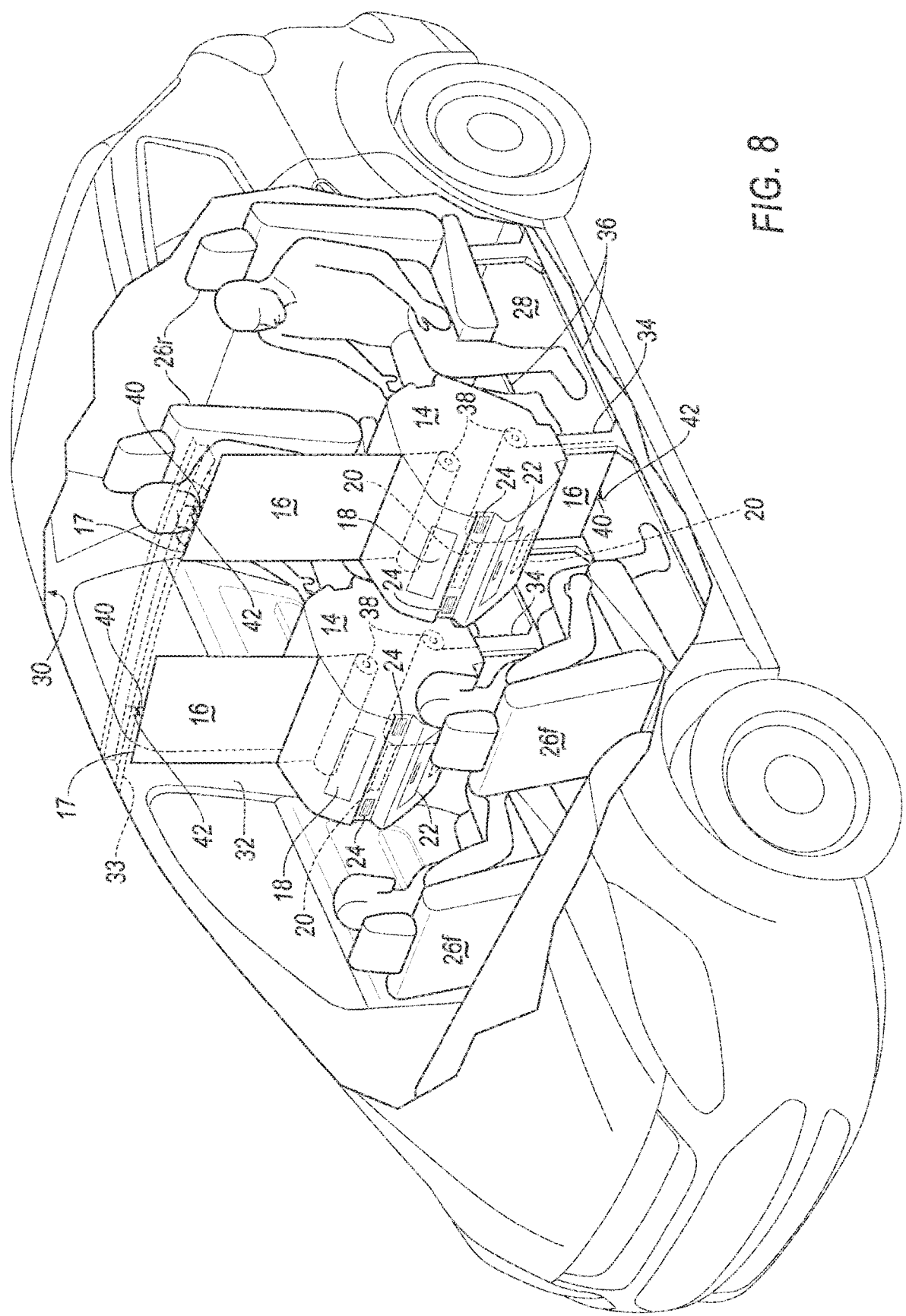
FIG. 8 is a perspective view of a portion of the cabin of the vehicle of FIG. 1, including an exemplary arrangement including a plurality of configurable consoles.

As seen in FIG. 8, a same side of the console 14 can face at least a first seat 26 and a second seat 26 in the vehicle. To allow users in side-by-side seats 26 to access a same console 14, the console 14 can be arranged to overlap both of the seats 26. For example, the console 14 can extend along a lateral axis of the vehicle 10 from a point on a longitudinal axis that passes through a point on the first seat 26 to a point on a longitudinal axis that passes through a point on the second seat 26.

Moreover, as seen in FIG. 8, more than one console 14 can be disposed in a vehicle cabin 12. A second console 14 can include one or more additional separator sheets that are configured as described above, e.g., extendable beyond boundaries of a second or additional console 14, and including at least one of an HMI 18, passive restraint 20, storage container 22, and vent 24. Further, each of two or more consoles 14 in a vehicle 10 could have different features. For example, a console 14 intended for higher paying, e.g., "first class" occupants might include a display screen in an HMI 18 configured to provide entertainment, whereas another console 14 in a same vehicle 10 intended for lower paying occupants might omit the display screen, or include an HMI 18 with a display configured only for providing input to control climate settings and the like. Likewise, respective sides of a console 14 could have different features, i.e., differ with respect to including one or more of an HMI 18, passive restraint 20, storage container 22, or vent 24, or with respect to a type of characteristics of such features (e.g., a size and quality of components of an HMI such as audio speakers, visual displays, etc.).

Further, multiple consoles 14 can be provided with respective tracks 36. For example a first console 14 and a second console 14 could be respectively engaged on a set of first one or more tracks 36 and a second set of second one or more tracks 36, the tracks 36 all being substantially parallel to one of a lateral and a longitudinal axis of the vehicle 10 (the longitudinal arrangement being shown in FIG. 8), wherein the console is moveable on the first track(s) 36 and the second console is movable on the second track(s) 36. Further, first and second consoles 14 can be movable independently on respective tracks 36, e.g., a first console could be moved while a second console 14 is not moved, the consoles 14 could be moved in different directions and/or different distances, etc.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A vehicle, comprising:
a console that includes a separator sheet extendable beyond boundaries of the console, and at least one of a human-machine interface; a passive restraint, a storage container, and a vent;
wherein the sheet is extendable at least one of vertically and horizontally.

2. The vehicle of claim 1, further comprising a forward seat and a rear seat that face each other in a deployed position, wherein the console is forward of the rear seat and aft of the forward seat in the vehicle.

3. The vehicle of claim 1, further comprising a seat, wherein the console is arranged on a track whereby the console is longitudinally movable in the vehicle toward and away from the seat.

4. The vehicle of claim 1, further comprising a seat, wherein the sheet is extendable from the console to cover the seat when the seat is in a stowed position.

5. The vehicle of claim 1, wherein the sheet is movable among a plurality of angles to a horizontal or vertical plane.

6. The vehicle of claim 1, wherein the sheet is extendable such that an end of the sheet is movable between a plurality of distances from a point on a surface of the console.

7. The vehicle of claim 1, wherein the sheet is securable to one or more of a vehicle pillar, a vehicle seat, a vehicle cabin floor, and a vehicle cabin ceiling.

8. The vehicle of claim 1, wherein the console is mounted to a vertical track, whereby the console is vertically movable.

9. The vehicle of claim 1, wherein the console includes a second separator sheet extendable beyond boundaries of the console.

10. The vehicle of claim 9, wherein the separator sheet and the second separator sheet are extendable from opposite surfaces of the console.

11. The vehicle of claim 1, wherein the sheet is tamboured.

12. The vehicle of claim 1, wherein the sheet includes at least one of fabric and flexible plastic.

13. The vehicle of claim 1, wherein a same side of the console faces at least a first seat and a second seat in the vehicle.

14. The vehicle of claim 1, wherein the console extends along a lateral axis of the vehicle from a point on a longitudinal axis with a point on the first seat to a point on a longitudinal axis with a point on the second seat.

15. The vehicle of claim 1, further comprising a second console that includes a second separator sheet extendable beyond boundaries of the second console, and at least one of a second human-machine interface; a second passive restraint, a second storage container, and a second vent.

16. The vehicle of claim 1, further comprising a first track and a second track that are each parallel to one of a lateral and a longitudinal axis of the vehicle, wherein the console is moveable on the first track and a second console is movable on the second track.

17. The vehicle of claim 16, wherein the console is movable on the first track independently from the second console on the second track.

18. A vehicle, comprising:
a console that includes a separator sheet extendable beyond boundaries of the console, and at least one of a human-machine interface; a passive restraint, a storage container, and a vent;
wherein the sheet is extendable such that an end of the sheet is movable between a plurality of distances from a point on a surface of the console.

19. The vehicle of claim 1, wherein the sheet is movable among a plurality of angles to a horizontal or vertical plane.

20. The vehicle of claim 1, wherein the sheet is securable to one or more of a vehicle pillar, a vehicle seat, a vehicle cabin floor, and a vehicle cabin ceiling.

* * * * *